UNITED STATES PATENT OFFICE.

FRIEDRICH STOLZ AND FRANZ FLAECHER, OF HÖCHST-ON-THE-MAIN, GERMANY, ASSIGNORS TO FARBWERKE VORM. MEISTER, LUCIUS & BRÜNING, OF HÖCHST-ON-THE-MAIN, GERMANY, A CORPORATION OF GERMANY.

ORTHODIOXYPHENYLETHANOLAMIN.

No. 862,675.  Specification of Letters Patent.  Patented Aug. 6, 1907.

Application filed September 13, 1906. Serial No. 334,445.

*To all whom it may concern:*

Be it known that we, FRIEDRICH STOLZ, Ph. D., and FRANZ FLAECHER, Ph. D., chemists, residing at Höchst-on-the-Main, Germany, have invented certain new and useful Orthodioxyphenylethanolamins, of which the following is a specification.

It is known that aminoacetopyrocatechols of the general formula $(HO)_2C_6H_3 CO-CH_2 NHX$, where X means hydrogen or alkyl, which are obtained by the action of ammonia or aliphatic amins on chloracetopyrocatechol, may be reduced, but the amino-alcohols thus formed have not heretofore been isolated in a pure state.

We have succeeded in doing so and have obtained the pure amino-alcohols which are valuable for their physiological action, it being similar to that of the base which takamin has isolated from the suprarenal glands.

The process consists in extracting the acid soluti n of the products of reduction of amino-acetopyrocatechol with a solvent, such as ether or ethyl acetate to eliminate the by-products of the reduction and in then adding to the concentrated aqueous solution an alkali, such as ammonia. The precipitated base may be transformed into its oxalate crystallizing from alcohol and again regenerated from the oxalate.

The process may be carried out, for instance, as follows:—One proceeds from the solution of the reduction products, obtained, for instance, by gradually adding 120 parts of sodium amalgam of 4 per cent. strength to 10 parts of the hydrochlorid of amino-acetopyrocatechol dissolved in 100 parts of water; the solution is kept cool and feebly acid by dropping into it dilute hydrochloric acid during the reduction. The acid solution of the reduction products is shaken out with ether, then concentrated in a vacuum, whereupon the shaking out is repeated until nothing further is absorbed by the ether. The aqueous solution to which ammonia has been added separates the new base when standing in the cold; it is filtered off, transformed into the oxalate which crystallizes from alcohol and is isolated again from the oxalate. The compound, ortho-dioxyphenylethanolamin, thus obtained has the formula $$(OH)_2C_6H_3 CH(OH)-CH_2NH_2,$$

consisting of exceedingly small crystals of the melting point 192° C. It is very difficultly soluble in water, alcohol and ether. When dry, it is stable. The hydrochlorid and oxalate of the base are very easily soluble in water, but the oxalate crystallizes from alcohol. The aqueous solution of the salts becomes green on adding ferric chlorid.

Having now described our invention, what we claim is—

As a new product, the ortho-dioxyphenylethanolamin $$(OH)_2C_6H_3CH(OH)-CH_2NH_2,$$

being a white micro-crystalline powder, very difficultly soluble in water, alcohol and ether; melting at 192°C. while decomposing, being stable when in a dry state; its hydrochlorid and oxalate being very soluble in water, but the oxalate crystallizing from alcohol; the solution of the salts becoming green on adding ferric chlorid.

In testimony, that we claim the foregoing as our invention, we have signed our names in presence of two subscribing witnesses.

FRIEDRICH STOLZ.
FRANZ FLAECHER.

Witnesses:
  JEAN GRUND,
  CARL GRUND.